(12) United States Patent
Kozuka et al.

(10) Patent No.: US 10,731,032 B2
(45) Date of Patent: Aug. 4, 2020

(54) DISPERSION ASSISTANT FOR SUSPENSION POLYMERIZATION, METHOD FOR PRODUCING VINYL-BASED POLYMER USING THE SAME, AND VINYL CHLORIDE RESIN

(71) Applicant: Japan Vam & Poval Co., Ltd., Osaka (JP)

(72) Inventors: Yoshiaki Kozuka, Osaka (JP); Takehiro Omori, Osaka (JP)

(73) Assignee: JAPAN VAM & POVAL CO., LTD., Osaka (JP)

( * ) Notice: Subject to any disclaimer, the term of this patent is extended or adjusted under 35 U.S.C. 154(b) by 164 days.

(21) Appl. No.: 15/778,189

(22) PCT Filed: Nov. 29, 2016

(86) PCT No.: PCT/JP2016/085281
§ 371 (c)(1),
(2) Date: May 22, 2018

(87) PCT Pub. No.: WO2017/094698
PCT Pub. Date: Jun. 8, 2017

(65) Prior Publication Data
US 2019/0031872 A1    Jan. 31, 2019

(30) Foreign Application Priority Data
Dec. 4, 2015  (JP) .................................. 2015-237965

(51) Int. Cl.
| | |
|---|---|
| *C08L 27/06* | (2006.01) |
| *C08F 8/28* | (2006.01) |
| *C08F 290/12* | (2006.01) |
| *C08L 29/14* | (2006.01) |
| *C08F 16/38* | (2006.01) |
| *C08F 2/20* | (2006.01) |
| *C08F 16/06* | (2006.01) |

(52) U.S. Cl.
CPC ................. *C08L 27/06* (2013.01); *C08F 2/20* (2013.01); *C08F 8/28* (2013.01); *C08F 16/06* (2013.01); *C08F 16/38* (2013.01); *C08F 290/12* (2013.01); *C08L 29/14* (2013.01)

(58) Field of Classification Search
CPC .......... C08F 2/20; C08F 216/06; C08F 16/06; C08F 16/38; C08L 29/04; C08L 29/14
See application file for complete search history.

(56) References Cited

U.S. PATENT DOCUMENTS

| | | | |
|---|---|---|---|
| 4,564,580 | A | 1/1986 | Ichimura et al. |
| 4,777,114 | A | 10/1988 | Ichimura et al. |
| 2009/0118424 | A1 | 5/2009 | Stark |
| 2017/0198068 | A1* | 7/2017 | Kozuka ..................... C08F 2/20 |

FOREIGN PATENT DOCUMENTS

| | | |
|---|---|---|
| JP | 54-76637 A | 6/1979 |
| JP | 60-247637 A | 12/1985 |
| JP | 61-230138 A | 10/1986 |
| JP | 62-161812 A | 7/1987 |
| JP | 4-85303 A | 3/1992 |
| JP | 4-93301 A | 3/1992 |
| JP | 6-279539 A | 10/1994 |
| JP | 7-319160 A | 12/1995 |
| JP | 2002-3510 A | 1/2002 |
| JP | 2003-238606 A | 8/2003 |
| JP | 2003-327607 A | 11/2003 |
| JP | 2004-115821 A | 4/2004 |
| JP | 2005-281550 A | 10/2005 |
| JP | 2005-281680 A | 10/2005 |
| JP | 2009-108305 A | 5/2009 |
| WO | WO 2015/005153 A1 | 1/2015 |
| WO | WO 2015/182567 A1 | 12/2015 |

OTHER PUBLICATIONS

International Preliminary Report on Patentability dated Jun. 14, 2018 for PCT/JP2016/085281, filed Nov. 29, 2016.
International Search Report for PCT/JP2016/085281 dated Feb. 28, 2017.

* cited by examiner

*Primary Examiner* — Mark S Kaucher
(74) *Attorney, Agent, or Firm* — Knobbe, Martens, Olson & Bear LLP

(57) ABSTRACT

An object of the present invention is to provide a dispersion assistant that, when used for suspension polymerization of a vinyl-based compound, achieves stable production of a good polymer (vinyl-based resin) without much scale adhesion on the polymerization tank even in the cases where used in a large amount. Provided is a dispersion assistant for suspension polymerization, which comprises a polyvinyl alcohol-based polymer (A) having an acetal group (a) having an olefinic unsaturated double bond, the polymer having a saponification degree of 60 mol% or less.

18 Claims, No Drawings

DISPERSION ASSISTANT FOR SUSPENSION POLYMERIZATION, METHOD FOR PRODUCING VINYL-BASED POLYMER USING THE SAME, AND VINYL CHLORIDE RESIN

CROSS REFERENCE TO RELATED APPLICATIONS

This application is a U.S. National Phase Application of PCT International Application Number PCT/JP2016/085281, filed on Nov. 29, 2016, designating the United States of America and published in the Japanese language, which is an International Application of and claims the benefit of priority to Japanese Patent Application No. 2015-237965, filed on Dec. 4, 2015. The disclosures of the above-referenced applications are hereby expressly incorporated by reference in their entireties.

TECHNICAL FIELD

The present invention relates to a polyvinyl alcohol-based polymer which can preferably be used as a dispersion assistant for suspension polymerization of a vinyl-based compound, a vinyl chloride-based resin produced using the polyvinyl alcohol-based polymer as a dispersion assistant, and a production method thereof.

BACKGROUND ART

Generally, a vinyl chloride-based resin (hereinafter may be referred to as a vinyl chloride-based polymer) is produced by suspension polymerization in which a vinyl chloride monomer is dispersed in an aqueous medium with a polymerization initiator, a dispersion stabilizer, etc. for polymerization.

Dispersants used in the suspension polymerization are divided into so-called "dispersion stabilizers" added to stabilize the dispersibility of the vinyl chloride monomer and adjust the particle diameter of the vinyl chloride-based resin to be produced, and so-called "dispersion assistants" added to increase the porosity of the vinyl chloride-based resin particles to be produced.

Conventionally, as the "dispersion stabilizer" (hereinafter may be referred to as primary dispersant), polyvinyl alcohol (PVA), hydroxypropylmethylcellulose, etc. are used (see Patent Literature 1 to 3). As the "dispersion assistant", PVAs having a saponification degree lower than that of the primary dispersant are used (see Patent Literature 4).

For example, in the method for producing a vinyl chloride-based polymer described in Patent Literature 4, a PVA having a saponification degree of 75 to 85 mol % is used as a dispersion stabilizer, and a PVA having a saponification degree of 20 to 57 mol % is used as a dispersion assistant.

For increased performance of the dispersion assistant, e.g., for an increased porosity of the particles of the vinyl chloride-based resin, other various suggestions have been made as in Patent Literature 5 to 7.

However, there has never been a dispersion assistant for suspension polymerization so far that achieves, regardless of the polymerization conditions, stable production of a good polymer without much scale adhesion to the polymerization tank even when used in a large amount to obtain a high porosity, and that enables production of a vinyl chloride-based resin having a high porosity and an excellent plasticizer absorbability, not having coarse particles. In particular, to obtain a vinyl chloride-based resin having a very high porosity, an increased amount of a dispersion assistant is needed, but use of such an increased amount causes a problem of unstable polymerization.

CITATION LIST

Patent Literature

Patent literature 1: JP 2002-003510 A
Patent literature 2: JP 2003-327607 A
Patent literature 3: JP 2003-238606 A
Patent literature 4: JP 2005-281680 A
Patent literature 5: JP 04-85303 A
Patent literature 6: JP 2004-115821 A
Patent literature 7: JP 04-93301 A

SUMMARY OF INVENTION

Technical Problem

An object of the present invention is to provide a dispersion assistant that, when used for suspension polymerization of a vinyl-based compound, achieves stable production of a good polymer (vinyl-based resin) without much scale adhesion to the polymerization tank even in the cases where used in a large amount.

Another object of the present invention is to provide a dispersion assistant for suspension polymerization that, when used for suspension polymerization of a vinyl-based compound, enables production of a vinyl-based resin (in particular, vinyl chloride-based resin) not having coarse particles.

Another object of the present invention is to provide a dispersion assistant for suspension polymerization that enables production of a vinyl-based resin (in particular, vinyl chloride-based resin) excellent in porosity, plasticizer absorbability, etc.

Another object of the present invention is to provide a method for producing, using the dispersion assistant, a vinyl-based resin excellent in porosity, plasticizer absorbability, etc.

Solution to Problem

In view of the circumstances, the present inventors conducted extensive research, and found that a dispersion assistant for suspension polymerization comprising (A) a polyvinyl alcohol-based polymer which has an acetal group having an olefinic unsaturated double bond and has a saponification degree of 60 mol % or less, even when used in a large amount for suspension polymerization of vinyl chloride, achieves stable production of a vinyl chloride-based resin without much scale adhesion to the polymerization tank. The present inventors conducted further examination and completed the present invention.

That is, the present invention relates to the following dispersion assistants for suspension polymerization, etc.

(1) A dispersion assistant for suspension polymerization, which comprises a polyvinyl alcohol-based polymer (A) having an acetal group (a) having an olefinic unsaturated double bond, the polymer having a saponification degree of 60 mol % or less.

(2) The dispersion assistant for suspension polymerization of the above (1), wherein the degree of modification of the polyvinyl alcohol-based polymer (A) by the acetal group (a)-containing unit is 0.01 to 20 mol % relative to all the monomer units in the polyvinyl alcohol-based polymer (A).

(3) The dispersion assistant for suspension polymerization of the above (1) or (2), wherein the average polymerization degree of the polyvinyl alcohol-based polymer (A) is 120 to 800.
(4) The dispersion assistant for suspension polymerization of any one of the above (1) to (3), which is used with a water-soluble polymer in a polymerization system for suspension polymerization.
(5) The dispersion assistant for suspension polymerization of the above (4), wherein the water-soluble polymer is a polyvinyl alcohol-based polymer having a saponification degree of 65 to 90 mol %.
(6) The dispersion assistant for suspension polymerization of any one of the above (1) to (5) for use in polymerization of a vinyl-based monomer.
(7) The dispersion assistant for suspension polymerization of the above (6), wherein the vinyl-based monomer comprises vinyl chloride.
(8) An aqueous liquid containing the dispersion assistant for suspension polymerization of any one of the above (1) to (7).
(9) A production method of a vinyl-based resin, comprising subjecting a vinyl-based monomer to suspension polymerization in the presence of the dispersion assistant for suspension polymerization of any one of the above (1) to (7).
(10) The production method of the above (9), wherein the suspension polymerization is performed further in the presence of a water-soluble polymer.
(11) The production method of the above (10), wherein the water-soluble polymer is a polyvinyl alcohol-based polymer having a saponification degree of 65 to 90 mol %.
(12) The production method of any one of the above (9) to (11), wherein the vinyl-based monomer comprises vinyl chloride.
(13) A vinyl-based resin which comprises, as a polymerization component, a polyvinyl alcohol-based polymer (A) having an acetal group (a) having an olefinic unsaturated double bond, the polymer having a saponification degree of 60 mol % or less.
(14) The vinyl-based resin of the above (13), wherein the degree of modification of the polyvinyl alcohol-based polymer (A) by the acetal group (a)-containing unit is 0.01 to 20 mol % relative to all the monomer units in the polyvinyl alcohol-based polymer (A).
(15) The vinyl-based resin of the above (13) or (14), wherein the average polymerization degree of the polyvinyl alcohol-based polymer (A) is 120 to 800.
(16) The vinyl-based resin of any one of the above (13) to (15), which is a vinyl chloride-based resin.

Advantageous Effects of Invention

The dispersion assistant for suspension polymerization of the present invention enables polymerization regardless of the polymerization conditions and achieves stable production of a good polymer (vinyl-based resin) without much scale adhesion to the polymerization tank even in the cases where used in a large amount to obtain a vinyl-based resin having a high porosity.

According to the present invention, a dispersion assistant for suspension polymerization that enables production of a vinyl-based resin (in particular, vinyl chloride-based resin) not having coarse particles can be provided.

Also, according to the present invention, a dispersion assistant for suspension polymerization that enables production of a vinyl-based resin (in particular, vinyl chloride-based resin) excellent in porosity, plasticizer absorbability, etc. can be provided.

Also, according to the present invention, a method for producing, using the dispersion assistant, a vinyl-based resin excellent in porosity, plasticizer absorbability, etc. can be provided.

DESCRIPTION OF EMBODIMENTS

Hereinafter, embodiments of the present invention will be described in detail. However, the present invention is not limited to the embodiments described below.

The dispersion assistant (additive, dispersant) for suspension polymerization of the present invention comprises a polyvinyl alcohol-based polymer (A) (PVA-based polymer (A)) having an acetal group (a) having an olefinic unsaturated double bond. The dispersion assistant for suspension polymerization of the present invention may comprise one kind of the PVA-based polymer (A) or two or more kinds thereof.

PVA-Based Polymer (A)

The PVA-based polymer (A) is not particularly limited as long as it has an acetal group (a) having an olefinic unsaturated double bond.

The acetal group (a) having an olefinic unsaturated double bond is not particularly limited, and is preferably, for example, a group which can be introduced via an OH group of a PVA-based polymer (B) and which is from a carbonyl compound having an olefinic unsaturated double bond. The acetal group (a) is preferably a cyclic acetal group.

The carbonyl compound is not particularly limited, and examples thereof include an aldehyde, a ketone, etc. preferably having an olefinic unsaturated double bond.

In the cases where a carbonyl compound having an olefinic unsaturated double bond is used, a PVA-based polymer (A) having an acetal group (a) having an olefinic unsaturated double bond is obtainable by, for example, acetalization of two adjacent OH groups of a PVA-based polymer (B) using an aldehyde and/or a ketone having an olefinic unsaturated double bond.

The aldehyde is preferably a monoaldehyde having an olefinic unsaturated double bond.

In the monoaldehyde (or acetal group (a)) having an olefinic unsaturated double bond, the number of olefinic unsaturated double bonds is not particularly limited, and is, for example, 1 to 5, or the like. The aldehyde may have a substituent (for example, a hydroxyl group, a nitro group, an aromatic group, etc.).

The monoaldehyde having an olefinic unsaturated double bond is not particularly limited, and examples thereof include unsaturated monoaldehydes, such as alkenals [for example, alkenals having 3 to 30 carbon atoms, such as acrolein, crotonaldehyde, methacrolein, 3-buthenal, 3-methyl-2-butenal, 2-methyl-2-butenal, 2-pentenal, 3-pentenal, 4-pentenal, 2-hexenal, 3-hexenal, 4-hexenal, 5-hexenal, 2-ethylcrotonaldehyde, 2-methyl-2-pentenal, 3-(dimethylamino)acrolein, myristoleic aldehyde, palmitoleic aldehyde, oleic aldehyde, elaidic aldehyde, vaccenic aldehyde, gadoleic aldehyde, erucic aldehyde, nervonic aldehyde, linoleic aldehyde, citronellal, and cinnamaldehyde; preferably alkenals having 3 to 25 carbon atoms], alkadienals [for example, alkadienals having 5 to 30 carbon atoms, such as 2,4-pentadienal, 2,4-hexadienal, 2,6-nonadienal, and citral; preferably alkadienals having 5 to 25 carbon atoms], alkatrienals [for example, alkatrienals having 7 to 30 carbon atoms, such as linolenic aldehyde and eleostearic aldehyde; preferably alkatrienals having 7 to 25 carbon atoms], alkatetraenals [for example, alkatetraenals having 9 to 30 carbon atoms, such as stearidonic aldehyde and arachidonic aldehyde; preferably alkatrienals having 9 to 25 carbon atoms], and alkapentaenals [for example, alkapentaenals having 11 to 30 carbon atoms, such as eicosapentaenoic aldehyde; preferably alkapentaenals having 11 to 25 carbon atoms]. In the cases where the monoaldehyde has cis and trans isomers, both isomers may be used. These monoaldehydes each having an olefinic unsaturated double bond may be used alone or in combination of two or more kinds thereof.

Polyvalent aldehydes, such as dialdehydes, are not preferred because they may unfavorably insolubilize the polyvinyl alcohol-based polymer (A) obtained after acetalization.

In the present invention, instead of the above-described monoaldehyde having an olefinic unsaturated double bond, an acetal which is a condensate of the monoaldehyde and an alcohol may also be used. The acetal is not particularly limited, and may be, for example, a condensate between the monoaldehyde and a primary alcohol.

The ketone is preferably a monoketone having an olefinic unsaturated double bond.

In the monoketone having an olefinic unsaturated double bond, the number of olefinic unsaturated double bonds is not particularly limited, and is, for example, 1 to 5, or the like. The ketone may have a substituent (for example, a hydroxyl group, a nitro group, an aromatic group, etc.).

The monoketone having an olefinic unsaturated double bond is not particularly limited, and examples thereof include unsaturated aliphatic monoketones {for example, alkenones [for example, alkenones having 4 to 30 carbon atoms, such as methyl vinyl ketone, preferably alkenones having 4 to 25 carbon atoms] etc.} etc. The ketones may be used alone or high performance liquid chromatography two or more kinds thereof.

Also, the PVA-based polymer (A) may have an acetal group (b) which is not within the category of acetal group (a). The method for introducing the acetal group (b) is not particularly limited, and examples of the method include acetalization of two adjacent OH groups of a PVA-based polymer (B) using a monoaldehyde not having any olefinic unsaturated double bond.

Examples of the monoaldehyde not having any olefinic unsaturated double bond include aliphatic aldehydes, such as formaldehyde, acetaldehyde, propionaldehyde, butyraldehyde, valeraldehyde, and hexanal; aromatic aldehydes, such as benzaldehyde, tolualdehyde, and terephthalaldehydic acid; etc.

The PVA-based polymer (A) has, as a unit having an acetal group (a) having an olefinic unsaturated double bond, a unit represented by the following formula (1).

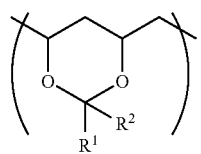

Formula (1)

(In the formula, $R^1$ denotes a group having an olefinic unsaturated double bond, and $R^2$ denotes a hydrogen atom or a substituent.)

Examples of $R^1$, which is a group having an olefinic unsaturated double bond, include alkenyl groups [for example, alkenyl groups having 2 to 30 carbon atoms, preferably alkenyl groups having 2 to 16 carbon atoms], alkadienyl groups [for example, alkadienyl groups having 4 to 30 carbon atoms, such as a 2,4-alkadienyl group and a 2,6-alkadienyl group; preferably alkadienyl groups having 4 to 16 carbon atoms], alkatrienyl groups [for example, alkatrienyl groups having 6 to 30 carbon atoms, preferably alkatrienyl groups having 6 to 16 carbon atoms], alkatetraenyl groups [for example, alkatetraenyl groups having 8 to 30 carbon atoms, preferably alkatetraenyl groups having 8 to 16 carbon atoms], alkapentaenyl groups [for example, alkapentaenyl groups having 10 to 30 carbon atoms, preferably alkapentaenyl groups having 10 to 16 carbon atoms], etc. These groups may further be substituted with one or more substituents (for example, a halogen atom, a hydroxyl group, a carboxyl group, an ether group, an ester group, an alkoxy group, a nitro group, an amino group, an aromatic group, etc.).

Examples of $R^2$ as a substituent include organic residues, such as hydrocarbon groups.

Examples of the hydrocarbon group include aliphatic groups {for example, saturated aliphatic groups (for example, alkyl groups having 1 to 20 carbon atoms, etc.) and unsaturated aliphatic groups (for example, alkenyl groups having 2 to 20 carbon atoms, etc.)}, aromatic groups (for example, aromatic hydrocarbon groups having 6 to 20 carbon atoms, etc.), etc. The hydrocarbon group may further be substituted with one or more substituents (for example, a halogen atom, a hydroxyl group, a carboxyl group, an ether group, an ester group, an alkoxy group, a nitro group, an amino group, etc.).

The degree of modification of the PVA-based polymer (A) by the unit having an acetal group (a) having an olefinic unsaturated double bond (the content of the unit having an acetal group (a) having an olefinic unsaturated double bond in the PVA-based polymer (A)) is preferably 0.01 to 20 mol %, more preferably 0.05 to 15 mol %, and particularly preferably 0.1 to 10 mol %, relative to all the monomer units in the PVA-based polymer (A).

The content of 1 mol % means that one unit having an acetal group (a) (for example, the constituent unit represented by the general formula (1)) is present per 100 monomer units (for example, vinyl alcohol units).

When the modification degree is 0.01 mol % or more, the effects of the unsaturated double bond introduction (for example, in the cases where the dispersion assistant is used in suspension polymerization of a vinyl-based monomer, even when used in a large amount to obtain a high porosity, reduced scale adhesion, prevention of occurrence of coarse particles, etc. can be achieved) are readily obtained. The modification degree of 20 mol % or less is preferable because the original properties of the PVA-based polymer (for example, dispersibility in an aqueous medium, etc.) are retained.

In the present invention, the method for measuring the degree of modification by the unit having an acetal group (a) having an olefinic unsaturated double bond (for example, the degree of modification by a monoaldehyde and/or a monoketone having an olefinic unsaturated double bond) is not particularly limited, and examples of the method include a method in which the PVA-based polymer (A) dissolved in a d6-DMSO solvent is subjected to $^1$H-NMR spectroscopy for analysis of signals attributable to a double bond, a method in which unreacted monoaldehyde is measured by high performance liquid chromatography or gas chromatography, etc.

The saponification degree of the PVA-based polymer (A) is 60 mol % or less, preferably 30 to 60 mol %, and more preferably not less than 30 mol % and less than 60 mol % as measured by the method specified in JIS K-6726.

The saponification degree of 60 mol % or less is preferable from the viewpoints that the dispersion assistant exhibits an excellent effect, that the porosity and the plasticizer absorbability of the obtained vinyl-based resin are improved, that the stability of the dispersion polymerization is excellent, that the particle size of the obtained vinyl-based resin is less likely to be coarsened, etc. The saponification degree of 30 mol % or more is preferable from the viewpoints that the polymer is readily dispersed in water and also readily dispersed in an aqueous medium at the time of suspension polymerization, etc.

The saponification degree of the PVA-based polymer (A) can be adjusted by the saponification degree of the PVA-based polymer (B), from which the PVA-based polymer (A) is obtained. For example, in the acetalization of the PVA-based polymer (B) using a monoaldehyde and/or a monoketone having an olefinic unsaturated double bond, allowing the reaction system to contain water leads to reduced change in saponification degree of the PVA-based polymer in the acetalization reaction. That is, the difference in the saponification degree between the PVA-based polymer (A) and the PVA-based polymer (B) can be kept within a range of, for example, about 0 to 5 mol %.

The (average) polymerization degree of the PVA-based polymer (A) is not particularly limited, and the polymerization degree as measured by the method specified in JIS K-6726 (Testing method for average polymerization degree of polyvinyl alcohol) is preferably 120 to 800, more preferably 160 to 700, and still more preferably 200 to 600.

The polymerization degree of the PVA-based polymer (A) of 120 or more is preferable from the viewpoints that the dispersion assistant of the present invention exhibits an excellent effect, that the particle size of the obtained vinyl-based resin is less likely to be coarsened, etc. The polymerization degree of 800 or less is preferable from the viewpoint that the polymer is readily dispersed in an aqueous medium at the time of suspension polymerization, etc.

The polymerization degree of the PVA-based polymer (A) can be adjusted by the polymerization degree of the PVA-based polymer (B), and usually, the polymerization degree of the PVA-based polymer (A) reflects the polymerization degree of the PVA-based polymer (B).

The block character of the residual fatty acid groups in the PVA-based polymer (A) is not particularly limited, and preferably 0.3 to 0.8. To obtain a vinyl-based resin having a high porosity and an excellent in plasticizer absorbability, the block character is more preferably 0.35 to 0.55.

Herein, the block character ($\eta$) of the residual fatty acid groups is an index showing the distribution of the residual fatty acid groups in the PVA-based polymer, and is determined by analysis of three peaks appearing in the methylene region of a $^{13}$C-NMR spectrum. The three peaks correspond to three kinds of dyads of (OH, OH), (OH, OR), and (OR, OR), and the ratio of the absorption intensities is proportional to the ratio of the three dyads. The block character ($\eta$) is represented by the formula (2) shown below. A residual fatty acid group (OR group) is a fatty acid group contained in a fatty acid vinyl ester unit (i.e., a unit from a fatty acid vinyl ester), for example, in the cases where vinyl acetate is used as the fatty acid vinyl ester, the residual fatty acid group (OR group) denotes an acetoxy group (OAc group).

$$\eta=(OH,OR)/[2(OH)(OR)] \quad \text{Formula (2)}$$

(In the formula, (OH, OR) denotes the fraction of the dyad (OH, OR) in which an OH group is adjacent to an OR group, and is determined from the relative intensity of the methylene carbon in a $^{13}$C-NMR spectrum. (OH) denotes the saponification degree expressed in molar percentage, and (OR) denotes the fraction of the residual fatty acid groups expressed in molar percentage.)

In the formula (2), (OH, OR) denotes the fraction of (OH, OR) relative to the total amount of (OH, OH), (OH, OR), and (OR, OR). Also, (OH) denotes the fraction of (OH) relative to the total amount of (OH) and (OR) contained in the PVA-based polymer (A), and (OR) denotes the fraction of (OR) relative to the total amount of (OH) and (OR) contained in the PVA-based polymer (A).

The block character takes a value of 0 to 2. A value closer to 0 means that the residual aliphatic acid groups exhibit a higher blocking tendency, a value closer to 1 means that OH groups and OR groups are present in a more random manner, and a value closer to 2 means that OH groups and OR groups are present in a more highly alternating manner. The block character of the residual fatty acid groups influences the dispersibility of a vinyl-based monomer, such as a vinyl chloride monomer. Regarding the block character, the measurement method and the like are described in detail in "Poval" published by Kobunshi Kankokai, 246-249 (1981) and Macromolecules, 10, 532 (1977).

The block character of the residual fatty acid groups of the PVA-based polymer (A) can be adjusted by the block character of the PVA-based polymer (B), from which is the PVA-based polymer (A) is obtained. For example, in the acetalization of the PVA-based polymer (B) using a monoaldehyde and/or a monoketone having an olefinic unsaturated double bond, allowing the reaction system to contain water leads to reduced change in the block character of the PVA-based polymer in the acetalization reaction. That is, the difference in the block character of the residual fatty acid groups between the PVA-based polymer (A) and the PVA-based polymer (B) can be kept within a range of, for example, about 0 to 0.1.

Acetalization

In the present invention, the method for introducing an acetal group (a) having an olefinic unsaturated double bond into the PVA-based polymer (A) is not particularly limited. For example, by acetalizing a PVA-based polymer (B) using a monoaldehyde and/or monoketone having an olefinic unsaturated double bond, a PVA-based polymer (A) having a unit represented by the above formula (1) can be obtained. The acetalization method is not particularly limited, and a publicly known acetalization method may be used.

In the acetalization, the amount used of the monoaldehyde and/or monoketone having an olefinic unsaturated double bond is not particularly limited, and is, for example, 0.01 to 20 parts by mass, preferably 0.05 to 15 parts by mass, and more preferably 0.1 to 10 parts by mass, relative to 100 parts by mass of the PVA-based polymer (B).

The acetalization is preferably performed in the presence of an acidic catalyst. The acidic catalyst is not particularly limited, and examples thereof include inorganic acids, such as hydrochloric acid, sulfuric acid, nitric acid, and phosphoric acid; and organic acids, such as formic acid, acetic acid, oxalic acid, and p-toluenesulfonic acid.

The amount used of the acidic acid is not particularly limited, and is, for example, 0.01 to 10 parts by mass relative to 100 parts by mass of the PVA-based polymer (B).

Specific examples of the acetalization method include the following methods: (i) a vinyl ester-based polymer is saponified in a solvent, such as methanol, in the presence of a basic catalyst, such as sodium hydroxide, to give a solution of a PVA-based polymer (B), to this, an acidic catalyst and a monoaldehyde and/or monoketone having an olefinic unsaturated double bond are added for acetalization, and then the solution is neutralized with a basic substance to give a solution of a PVA-based polymer (A); (ii) a vinyl ester-based polymer is saponified in a solvent, such as methanol, in the presence of an acidic catalyst as a saponification catalyst to give a PVA-based polymer (B), to this, a monoaldehyde and/or monoketone having an olefinic unsaturated double bond is added still in the presence of the acidic catalyst for acetalization, and then the solution is neutralized with a basic substance to give a solution of a PVA-based polymer (A); (iii) a vinyl ester-based polymer is saponified in a solvent in the presence of an acidic catalyst to give a PVA-based polymer (B) as in the above (ii) except that the monoaldehyde and/or monoketone having an olefinic unsaturated double bond is added before the start of the saponification, the PVA-based polymer (B) is acetalized, and then the solution is neutralized with a basic substance to give a solution of a PVA-based polymer (A); (iv) a monoaldehyde and/or monoketone having an olefinic unsaturated double bond is dissolved in a PVA-based polymer (B) aqueous liquid for reaction in the presence of an acid catalyst, and then the resulting solution is neutralized with a basic substance to give a PVA-based polymer (A); (v) to a slurry or powdery PVA-based polymer (B), a monoaldehyde and/or monoketone having an olefinic unsaturated double bond is directly added, or a liquid in which the monoaldehyde and/or monoketone is dissolved or dispersed in an alcohol, such as methanol, ethanol, and propanol, or water is added, an acid catalyst is added to the mixture for reaction, and then the resulting mixture is neutralized with a basic substance and dried for removing excess solvent to give a PVA-based polymer (A); etc.

In the methods (i) to (iii), by subsequent drying for removing the solvent, the PVA-based polymer can be obtained as a solid, or alternatively, by replacing the solvent with water, an aqueous liquid can be obtained.

The PVA-based polymer obtained as an aqueous liquid in the method (iv) can be used as it is in suspension polymerization.

In the method (v) in which a slurry PVA-based polymer is reacted, the obtained PVA-based polymer is a solid and therefore easy to handle.

In the methods (i) to (v), the method for preparing an aqueous liquid of the PVA-based polymer (A) or the PVA-based polymer (B), and the methods for saponification, neutralization, dissolution, dispersion, and drying are not particularly limited, and conventional methods may be used.

The basic substance used for neutralization is not particularly limited, and examples thereof include alkali metal hydroxides, such as sodium hydroxide and potassium hydroxide; alkali metal carbonates, such as sodium carbonate and potassium carbonate; primary alkanolamines, such as monoethanolamine, aminoethylethanolamine, monoisopropanolamine, N-(2-hydroxypropyl)-ethylenediamine, 2-amino-1-butanol, 2-amino-2-methyl-1-propanol, 3-amino-1-propanol, 2-amino-2-methyl-1,3-propanediol, 2-amino-2-ethyl-1,3-propanediol, and tris(hydroxyethyl)-aminomethane; secondary alkanolamines, such as diethanolamine, methylethanolamine, butylmethanolamine, N-acetylethanolamine, and diisopropanolamine; tertiary alkanolamines, such as triethanolamine, methyldiethanolamine, dimethylethanolamine, diethylethanolamine, ethyldiethanolamine, and tri-isopropanolamine; primary alkylamines, such as methylamine, ethylamine, isobutylamine, tert-butylamine, and cyclohexylamine; secondary alkylamines, such as dimethylamine, diethylamine, and diisopropylamine; and tertiary alkylamines, such as trimethylamine.

The pH at the time of acetalization is preferably 3.0 or less from the viewpoint of reaction rate.

The neutralized pH is preferably 4.7 to 8.5 from the viewpoint of the stability of the PVA-based polymer.

PVA-Based Polymer (B)

The PVA-based polymer (B) is not particularly limited, and for example, a conventionally known PVA-based polymer obtainable by saponification of a vinyl ester-based polymer may be used.

The vinyl ester-based polymer is obtainable by polymerizing a vinyl ester-based monomer. The polymerization method is not particularly limited, and may be a conventionally known method, such as bulk polymerization, solution polymerization, suspension polymerization, emulsion polymerization, or the like. Considering the control of the polymerization degree and saponification performed after the polymerization, solution polymerization using methanol as a solvent or suspension polymerization using water or a combination of water and methanol as a dispersion medium is preferred, but the method is not limited to these.

The vinyl ester-based monomer used for the polymerization is not particularly limited, and examples thereof include aliphatic vinyl esters, such as vinyl acetate, vinyl formate, vinyl propionate, vinyl caprylate, and vinyl versatate. These vinyl ester-based monomers may be used alone or in combination of two or more kinds thereof. Among them, vinyl acetate is industrially preferred.

In the polymerization of the vinyl ester-based monomer, the vinyl ester-based monomer may be copolymerized with another kind of monomer as long as the effect of the present invention is exerted.

Said another monomer used in the copolymerization is not particularly limited, and examples thereof include α-olefins, such as ethylene, propylene, n-butene, and isobutylene; (meth)acrylic acid and salts thereof; (meth)acrylic esters, such as (meth)acrylic alkyl esters (such as $C_{1-20}$ alkyl (meth)acrylates, such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, dodecyl (meth)acrylate, and octadecyl (meth)acrylate); (meth)acrylamide and (meth)acrylamide derivatives, such as N-methyl(meth)acrylamide, N-ethyl(meth)acrylamide, N,N-dimethyl(meth)acrylamide, diacetone (meth)acrylamide, (meth)acrylamide propane sulfonic acid and salts thereof, (meth)acrylamidopropyldimethylamine and salts or quaternary salts thereof, and N-methylol(meth)acrylamide; vinyl ethers, such as $C_{1-20}$ alkyl vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles, such as acrylonitrile and methacrylonitrile; vinyl halides, such as vinyl chloride and vinyl fluoride; vinylidene halides, such as vinylidene chloride and vinylidene fluoride; allylic compounds, such as allyl acetate and allyl chloride; unsaturated dicarboxylic acids, such as maleic acid, itaconic acid, and fumaric acid, and salts or esters thereof; vinylsilyl compounds, such as vinyltrimethoxysilane; aliphatic alkylesters, such as isopropenyl acetate; and the like. The monomers may be used alone or in combination of two or more kinds thereof.

When said another monomer is used, the content of the monomer is, for example, 0.1 to 20% by mass relative to the total amount of the vinyl ester-based monomer.

In the polymerization of a vinyl ester-based monomer, a chain transfer agent may be added for the purpose of controlling the polymerization degree of the resulting vinyl ester-based polymer.

The chain transfer agent is not particularly limited, and examples thereof include aldehydes, such as acetaldehyde, propionaldehyde, butyraldehyde, and benzaldehyde; ketones, such as acetone, methyl ethyl ketone, hexanone, and cyclohexanone; mercaptans, such as 2-hydroxyethanethiol and dodecyl mercaptan; and organic halogens, such as carbon tetrachloride, trichloroethylene, and perchloroethylene. Among them, aldehydes and ketones are preferably used. The amount of the chain transfer agent added is determined depending on the chain transfer constant of the chain transfer agent and the intended polymerization degree of the vinyl ester-based polymer, and in general, is preferably 0.1 to 10 weight % relative to the vinyl ester-based monomer.

A PVA-based polymer (B) can be produced by subjecting the vinyl ester-based polymer obtained as described above to saponification.

The saponification method of the vinyl ester-based polymer is not particularly limited, and may be a conventionally known method. Examples of the method include alcoholysis or hydrolysis using a basic catalyst, such as hydroxides of alkali metals, such as sodium hydroxide and potassium hydroxide; hydroxides of alkaline earth metals, such as calcium hydroxide; and organic amines, such as primary alkanolamines, such as monoethanolamine, aminoethylethanolamine, monoisopropanolamine, N-(2-hydroxypropyl)-ethylenediamine, 2-amino-1-butanol, 2-amino-2-methyl-1-propanol, 3-amino-1-propanol, 2-amino-2-methyl-1,3-propanediol, 2-amino-2-ethyl-1,3-propanediol, and tris(hydroxyethyl)-aminomethane; secondary alkanolamines, such as diethanolamine, methylethanolamine, butylmethanolamine, N-acetylethanolamine, and diisopropanolamine; tertiary alkanolamines, such as triethanolamine, methyldiethanolamine, dimethylethanolamine, diethylethanolamine, ethyldiethanolamine, and tri-isopropanolamine; primary alkylamines, such as methylamine, ethylamine, isobutylamine, tert-butylamine, and cyclohexylamine; secondary alkylamines, such as dimethylamine, diethylamine, and diisopropylamine; and tertiary alkylamines, such as trimethylamine; or an acidic catalyst, such as inorganic acids, such as hydrochloric acid, sulfuric acid, nitric acid, and phosphoric acid; and organic acids, such as formic acid, acetic acid, oxalic acid, and p-toluenesulfonic acid.

Examples of the solvent used for the saponification include alcohols, such as methanol and ethanol; esters, such as methyl acetate and ethyl acetate; ketones, such as acetone and methyl ethyl ketone; aromatic hydrocarbons, such as benzene and toluene; etc., and these may be used alone or in combination of two or more kinds.

The saponification degree of the PVA-based polymer (B) is not particularly limited. In the subsequent acetalization, the resulting PVA-based polymer (A) has a saponification degree higher than that of the PVA-based polymer (B) as the starting material. Therefore, the saponification degree of the PVA-based polymer (B) is preferably adjusted to a value lower (for example, 0 to 5 mol % lower) than the targeted saponification degree of the PVA-based polymer (A).

The polymerization degree of the PVA-based polymer (B) is not particularly limited. In the subsequent acetalization, the resulting PVA-based polymer (A) has a polymerization degree reflecting that of the PVA-based polymer (B) as the starting material. Therefore, the polymerization degree of the PVA-based polymer (B) is preferably adjusted to a targeted polymerization degree of the PVA-based polymer (A).

The block character of the residual fatty acid groups of the PVA-based polymer (B) is not particularly limited, and is preferably adjusted to almost the same value as the targeted block character of the PVA-based polymer (A).

In the present invention, the block character of the residual fatty acid groups of the PVA-based polymer (B) can be adjusted by selecting the kinds of the saponification catalyst, the solvent, and the like used in the production of the PVA-based polymer (B) by saponification of a vinyl ester-based polymer.

Aqueous Liquid

As a dispersion assistant, the PVA-based polymer (A) may be used as it is or dissolved in water for use as an aqueous liquid.

For example, a PVA-based polymer (A) (for example, a polyvinyl alcohol-based polymer (A) having a saponification degree of 45 to 60 mol %, an average polymerization degree of 120 to 400, and a block character of 0.5 or higher) as a dispersoid dispersed or dissolved in water at a concentration of 30 to 50% by mass may be used. The concentration of the polymer (A) of 30% by mass or more is preferable from the viewpoints that a good compatibility with water and an improved standing stability of the aqueous liquid are achieved, etc. The concentration of 50% by mass or less is preferable from the viewpoints that an excellent flowability of the aqueous liquid is achieved, etc.

The method for preparing the aqueous liquid is not particularly limited, and examples thereof include a method in which the solvent, such as methanol, used at the time of acetalization is replaced with water by steam injection or the like, a method in which the PVA-based polymer (A) is added to water with stirring, and the PVA is dissolved or dispersed in water by continuous stirring, optionally with heating, etc.

For an improved standing stability, the aqueous liquid may further comprise a water-soluble organic solvent etc. Examples of the water-soluble organic solvent include alcohols, such as methanol, ethanol, n-propanol, isopropanol, n-butanol, and isobutanol; esters, such as methyl acetate and ethyl acetate; and glycol derivatives, such as ethylene glycol, ethylene glycol monomethyl ether, and ethylene glycol monoethyl ether; etc. The organic solvents may be used alone or in combination of two or more kinds thereof.

From the viewpoints of environmental consciousness and an improved workability, the content of the organic solvent is preferably 3.0% by mass or less relative to the aqueous liquid.

Production Method of Vinyl-Based Polymer

The method of suspension polymerization of a vinyl-based monomer using the dispersion assistant of the present invention will be described. By suspension polymerization of a vinyl-based monomer in the presence of the dispersion assistant of the present invention, a vinyl-based polymer can be produced.

Usually, for suspension polymerization, the dispersion assistant of the present invention is added to an aqueous solvent (for example, water, heated water, etc.) to disperse a vinyl-based monomer. The suspension polymerization is usually performed in the presence of a polymerization initiator.

The suspension polymerization is usually performed in the presence of a dispersion stabilizer in the polymerization system. The dispersion stabilizer is usually a so-called primary dispersant added for particle diameter adjustment.

The vinyl-based monomer to be subjected to suspension polymerization is not particularly limited, and examples thereof include vinyl chloride, vinylidene halides, vinyl ethers, vinyl esters (such as vinyl acetate and vinyl benzoate), (meth)acrylic acids, (meth)acrylic esters (such as (meth)acrylic acid alkyl esters), styrene-based monomers (such as styrene), unsaturated dicarboxylic acid (such as maleic acid) or anhydrides thereof, olefins (such as ethylene and propylene), etc. Preferably, the vinyl-based monomer comprises at least vinyl chloride. The vinyl monomers may be used alone or in combination of two or more kinds thereof.

By suspension polymerization of a vinyl-based monomer comprising vinyl chloride, a vinyl chloride-based resin can be obtained. In the production of the vinyl chloride-based resin, the vinyl chloride content is preferably 50 to 100 mol % (or 50 to 100% by mass) relative to the total amount of vinyl-based monomers used.

Examples of the dispersion stabilizer include water-soluble polymers, such as cellulose derivatives (such as methyl cellulose, hydroxypropylcellulose, hydroxypropylmethylcellulose, and carboxymethylcellulose), gelatin, polyvinyl alcohol, and polyvinyl pyrrolidone, etc.

Among them, PVA-based polymers are preferred. The PVA-based polymer is not particularly limited as long as the saponification degree is 60 mol % or more, and the saponification degree may be 65 to 90 mol %. Preferably used are PVA-based polymers having a saponification degree of 65 to 90 mol % and PVA-based polymers having a polymerization degree of 500 to 3500.

The amount of the dispersion stabilizer added varies depending on the type of the dispersion stabilizer and other factors, but is usually 5 parts by mass or less, preferably 0.005 to 1 part by mass, and more preferably 0.01 to 0.5 part by mass relative to 100 parts by mass of the vinyl monomer.

In the suspension polymerization of the vinyl-based monomer, the amount of the dispersion assistant of the present invention used is not particularly limited. Usually, the mass of the PVA-based polymer (A) contained in the dispersion assistant is 1 part by mass or less (for example, 0.001 to 1 part by mass), preferably 0.001 to 0.5 part by mass, and more preferably 0.005 to 0.2 part by mass relative to 100 parts by mass of the vinyl-based monomer.

Generally, an increased amount of the dispersion assistant leads to unstable suspension polymerization, but the dispersion assistant of the present invention, even when used in a large amount (for example, 50 parts by weight or more of the dispersion assistant is used relative to 100 parts by weight of the dispersion stabilizer), achieves stable suspension polymerization of a vinyl-based monomer.

The ratio of the dispersion stabilizer and the PVA-based polymer (A) contained in the dispersion assistant of the present invention varies depending on the type of the dispersion stabilizer and other factors, but is preferably in the range of 90/10 to 30/70 and particularly preferably in the range of 80/20 to 50/50.

Generally, an increased ratio of the dispersion assistant used (in particular, the ratio of the dispersion assistant to the dispersion stabilizer) leads to a higher porosity of the vinyl-based resin obtained, but tends to lead to unstable suspension polymerization. The dispersion assistant of the present invention, even when used in a high ratio (in particular, a high ratio to the amount of the dispersion stabilizer used), enables stable suspension polymerization.

The dispersion assistant and the dispersion stabilizer may be added all at once at the beginning of the polymerization or added in divided portions during the polymerization.

The dispersion assistant of the present invention may be added in the form of a powder to the polymerization system of the vinyl-based monomer. Alternatively, an aqueous liquid (preferably, an aqueous liquid containing 30 to 50% by mass of the PVA-based polymer (A)) may be prepared before use. Also, the dispersion assistant of the present invention may be dissolved in a water-soluble organic solvent or a mixed solvent of water and an organic solvent and then added to the polymerization system. The dispersion assistant of the present invention may be added at the same time as or after the addition of the vinyl-based monomer, but is preferably placed in the polymerization system before the addition of the vinyl-based monomer.

The polymerization initiator is not particularly limited, and may be oil-soluble. Examples thereof include percarbonate compounds, such as diisopropyl peroxydicarbonate, di-(2-ethylhexyl)peroxydicarbonate, and diethoxyethyl peroxydicarbonate; peroxyester compounds, such as t-butylperoxyneodecanoate, t-hexylperoxyneodecanoate, t-hexylperoxypivalate, α-cumylperoxyneodecanoate, t-hexylneohexanoate, and 2,4,4-trimethylpentyl-2-peroxy-2-neodecanoate; azo compounds, such as azobis(2,4-dimethylvaleronitrile) and azobisisobutylonitrile; peroxide compounds, such as lauryl peroxide, benzoyl peroxide, cumene hydroperoxide, and 2,4,4-trimethylpentyl-2-peroxyphenoxyacetate; etc.

The polymerization initiator may be added before or after the addition of water or the monomer. Alternatively, the polymerization initiator prepared beforehand as an aqueous emulsion may be added to the polymerization tank.

The amount of the polymerization initiator added is preferably 0.02 to 0.5 part by mass relative to 100 parts by mass of the vinyl monomer or a monomer mixture containing the vinyl monomer.

Within the range where the effects of the present invention are not hindered, a cationic, anionic, or nonionic surfactant etc. may be added at the time of suspension polymerization.

Various conditions in the production method of the vinyl-based resin of the present invention may be determined according to the known art. There are no particular limitations in the polymerization conditions, such as the method for feeding each starting compound, the feeding ratio between the monomer and the aqueous solvent, the polymerization temperature, the polymerization conversion rate, the stirring rate, etc. As needed, various publicly known additives, such as a defoaming agent, a polymerization degree modifier, a chain transfer agent, an antioxidant, and an antistatic agent, may be used in combination.

Vinyl-Based Resin

The present invention includes particular vinyl-based resins. The production method of the vinyl chloride-based resin is not particularly limited. Usually, the vinyl chloride-based resin is produced by the above-described suspension polymerization of a vinyl-based monomer.

The vinyl-based resin may contain a PVA-based polymer (A), and the polymer chain of the vinyl-based resin may contain the PVA-based polymer (A) as a polymer component.

For example, a vinyl-based resin containing a PVA-based polymer (A) as a polymer component can be produced by subjecting a vinyl-based monomer to suspension polymerization in the presence of the dispersion assistant of the present invention, where part of the PVA-based polymer (A) contained in the dispersion assistant is subjected to suspension polymerization together with the vinyl-based monomer.

In the vinyl-based resin, the content of the unit from the PVA-based polymer (A) is not particularly limited, and is, for example, 0.001 to 1 mol %, preferably 0.001 to 0.5 mol %, and more preferably 0.005 to 0.2 mol % in terms of the monomer constituting the vinyl-based resin.

The present invention includes particular vinyl chloride-based resins. The production method of the vinyl chloride-based resin is not particularly limited. Usually, the vinyl chloride-based resin is produced by the above-described suspension polymerization of a vinyl-based monomer.

A vinyl chloride-based resin can usually absorb dioctyl phthalate used as a plasticizer for the vinyl chloride-based resin in an amount of 10 parts by mass or more, preferably 13 to 40 parts by mass, and more preferably 15 to 40 parts by mass relative to 100 parts by mass of the vinyl chloride-based resin although the optimum value of the absorption depends on the application of the vinyl chloride-based resin. A higher plasticizer absorbability is preferable for reduced fish eyes in a resulting vinyl chloride-based resin. However, a higher plasticizer absorbability usually leads to a lower bulk specific gravity. Therefore, in applications of hard vinyl chloride-based resins not requiring much plasticizer, i.e., applications, such as pipes or window frames, the plasticizer absorbability does not need to be very high, and is preferably 10 parts by mass or higher. In the cases of applications of soft vinyl chloride-based resins requiring much plasticizer, i.e., applications, such as sheets or films, the plasticizer absorbability is preferably 20 parts by mass or higher. A dispersion assistant is used primarily for increasing plasticizer absorbability, and the plasticizer absorbability can be adjusted by adjusting the amount of the dispersion assistant added. The dispersion assistant of the present invention may be used for both hard and soft vinyl chloride-based resin applications. The method for measuring the plasticizer absorbability is not particularly limited, and for example, the method described in Examples below can be used for the measurement.

The average particle diameter of the vinyl chloride-based resin is, for example, 100 to 200 μm, preferably 110 to 190 μm, and more preferably 120 to 180 μm. The method for measuring the average particle diameter is not particularly limited, and for example, by measuring particle size distribution using a low tap sieve shaker (using a JIS sieve), the average particle diameter can be determined.

The maximum particle diameter of the vinyl chloride-based resin is usually 250 μm or less. In the vinyl chloride-based resin, the proportion of particles that do not pass through a JIS #60 sieve is preferably less than 0.1% by mass. The particle size distribution of the vinyl chloride-based resin is preferably within the range of 60 to 250 μm.

In the vinyl chloride-based resin, the proportion of particles that pass through a JIS #250 sieve is preferably less than 0.1% by mass.

The methods for measuring the maximum particle diameter and the particle size distribution are not particularly limited, and for example, by measuring particle size distribution using a low tap sieve shaker (using a JIS sieve), the maximum particle diameter can be determined.

The bulk specific gravity (bulk density) of the vinyl chloride-based resin is, for example, 0.35 to 0.65 g/mL, preferably 0.4 to 0.6 g/mL, and more preferably 0.5 to 0.6 g/mL.

A higher bulk specific gravity is preferred for an improved extrusion speed. The bulk specific gravity can be measured in accordance with JIS K-6721.

The vinyl chloride-based resin of the present invention has excellent properties, such as absence of coarse particles, excellent plasticizer absorbability, high porosity, reduced occurrence of fish eyes, etc.

EXAMPLES

Hereinafter, the present invention will be illustrated in more detail by Examples, but the present invention is not limited thereto.

In the Examples and Comparative Example, "%" and "parts" express "% by mass" and "part(s) by mass" unless otherwise stated.

First, methods for evaluating the properties of vinyl chloride resins employed in the EXAMPLES are shown below.

Evaluation of Vinyl Chloride Resin

Vinyl chloride resins were measured for the average particle diameter, the coarse particle content, the amount of attached scale, the bulk specific gravity, the plasticizer absorbability, and fish eyes as follows.

Average Particle Diameter and Coarse Particle Content

Using a low tap sieve shaker (using a JIS sieve), particle size distribution was measured, and the average particle diameter was determined. From the measured particle size distribution, the content of coarse particles of 60 mesh-on (i.e., having a particle diameter of 250 μm or more) was determined and shown in %. A lower content means a smaller number of coarse particles, a sharper particle size distribution, and a better polymerization stability. In Table 2 and Table 3 below, the content is represented as On#60.

Amount of Attached Scale

After the polymer slurry was discharged from the polymerization tank, the scale adhesion on the inner wall of the polymerization tank was visually observed and evaluated based on the following criteria.

Excellent: Almost no scale adhesion is observed
Good: Visually noticeable adhesion is observed
Poor: Remarkable adhesion of white scale is observed Bulk Specific Gravity The bulk specific gravity was measured in accordance with JIS K-6721. A greater bulk specific gravity means a higher extrusion speed and a superior processability.

Plasticizer Absorbability

In a cylindrical container having fiberglass placed in the bottom, the obtained resin was placed, and excess dioctyl phthalate (hereinafter abbreviated as DOP) was added thereto. The mixture was left to stand for 30 minutes for infiltration of the DOP into the resin and subjected to centrifugal separation at 3000 rpm for removal of excess DOP. Then the resin was weighed to calculate the amount of the DOP absorbed into 100 parts by mass of the polymer. A larger amount of absorbed DOP means a higher porosity, a higher plasticizer absorbability, and a higher molding processability. Also, a higher plasticizer absorbability means a higher porosity of the vinyl chloride polymer.

Fish Eye

At 150° C., 100 parts by mass of the obtained resin, 30 parts by mass of dioctyl phthalate, 1 part by mass of tribasic lead sulphate, 1.5 parts by mass of lead stearate, 0.2 part by mass of titanium dioxide, and 0.1 part by mass of carbon black were melted and kneaded for 3 minutes, and a sheet having a thickness of 0.3 mm was produced. The number of fish eyes (transparent particles having a diameter of 0.4 mm or more) in 100 mm×100 mm of the obtained sheet was visually determined.

Example 1

Synthesis of PVA-Based Polymer (B)

In a polymerization tank equipped with a stirrer, a condenser, a nitrogen gas inlet, and an initiator feeding port, 10 parts by mass of vinyl acetate, 67 parts by mass of methanol, and 0.02 part by mass of 2,2'-azobis(4-methoxy-2,4-dimethylvaleronitril) were placed. After replacement with nitrogen gas, the system was heated to the boiling point. Then, from the upper part of the polymerization tank, 140 parts by mass of vinyl acetate was continuously and slowly added dropwise over 13 hours. One hour after the completion of the dropping, when the polymerization degree reached 95%, the system was cooled to terminate the polymerization.

Subsequently, unreacted vinyl acetate was removed in the usual manner, and the methanol content was adjusted so that the concentration of polyvinyl acetate might be 60%. To 100 parts by mass of the obtained 60% polyvinyl acetate solution in methanol, 3 parts by mass of a 5% sodium hydroxide solution in methanol as a saponification catalyst was added and thoroughly mixed, and saponification was allowed to proceed at 40° C. To this, 0.3 part by mass of a 5% acetic acid solution in methanol was added for neutralization to terminate the saponification, and thus a solution of a PVA-based polymer (B) was obtained. The obtained solution, after drying, was analyzed. The saponification degree was 53.0 mol %, the average polymerization degree was 230, and the block character was 0.45.

Synthesis of PVA-Based Polymer (A)

To 100 parts by mass of the above-obtained solution of PVA-based polymer (B), 2 parts by mass of water was added, and then 0.35 part by mass of acrolein was added and thoroughly mixed. To this, 1 part by mass of a 45% p-toluenesulfonic acid solution in methanol was added, and reaction was allowed to proceed at 40° C. for 30 minutes. Then, the mixture was neutralized with 2.3 parts by mass of a 5% sodium hydroxide aqueous liquid. Subsequently, the solution was dried at 100° C. for 2 hours using a vacuum dryer to give a PVA-based polymer (A). The analysis of the PVA-based polymer (A) showed that the saponification degree was 55.3 mol %, the polymerization degree was 230, and the block character was 0.47. Moreover, when the PVA-based polymer (A) dissolved in a d6-DMSO solvent was subjected to $^1$H-NMR spectroscopy, signals attributable to a double bond were observed at 5.8, 5.4, and 5.2 ppm. The modification degree of the PVA-based polymer (A) modified by acrolein calculated from the signal strengths was 0.9 mol %.

The summary of the production conditions and the analysis results of the PVA-based polymer (A) are shown in Table 1.

Suspension Polymerization of Vinyl Chloride (1)
(Formulation Having Lower Ratio of Dispersion Assistant)

Using the above-obtained PVA-based polymer (A) as a dispersion assistant, suspension polymerization of vinyl chloride was performed on the conditions shown below.

In a 100-L polymerization vessel (pressure-proof autoclave unit), 0.06 part by mass of partially saponified polyvinyl alcohol (saponification degree: 80 mol %, polymerization degree: 2500) and 0.02 part by mass of partially saponified polyvinyl alcohol (saponification degree: 72 mol %, polymerization degree: 800) dissolved in 112.5 parts of deionized water were placed. To this, the above-obtained dispersion assistant of the present invention (0.025 part by mass of PVA-based polymer (A)) dissolved in 1.25 parts by mass of water/methanol=1/1 (mass ratio) was added, and 0.05 part by mass of t-butylperoxyneodecanoate was further added. The pressure inside the polymerization vessel was reduced to 40 mmHg for deaeration, 100 parts by mass of a vinyl chloride monomer was added, and stirring was started. The polymerization temperature was 57° C., which was maintained until the end of the polymerization.

At the time when the polymerization conversion rate reached 80%, the unreacted monomer in the polymerization vessel was recovered. Then, the polymer slurry was taken out of the system, dehydrated, and dried to give a vinyl chloride resin. The evaluation results of the vinyl chloride resins are shown in Table 2.

Suspension Polymerization of Vinyl Chloride (2)
(Formulation Having Higher Ratio of Dispersion Assistant)

Using the above-obtained PVA-based polymer (A) as a dispersion assistant, suspension polymerization of vinyl chloride was performed on the conditions shown below.

In a 100-L polymerization vessel (pressure-proof autoclave unit), 0.04 part by mass of partially saponified polyvinyl alcohol (saponification degree: 80 mol %, polymerization degree: 2500) and 0.01 part by mass of partially saponified polyvinyl alcohol (saponification degree: 72 mol %, polymerization degree: 800) dissolved in 112.5 parts of deionized water were placed. To this, the above-obtained dispersion assistant of the present invention (0.05 part by mass of PVA-based polymer (A)) dissolved in 1.25 parts by mass of water/methanol=1/1 (mass ratio) was added, and 0.05 part by mass of t-butylperoxyneodecanoate was further added. The pressure inside the polymerization vessel was reduced to 40 mmHg for deaeration, 100 parts by mass of a vinyl chloride monomer was added, and stirring was started. The polymerization temperature was 57° C., which was maintained until the end of the polymerization.

At the time when the polymerization conversion rate reached 80%, the unreacted monomer in the polymerization vessel was recovered. Then, the polymer slurry was taken out of the system, dehydrated, and dried to give a vinyl chloride resin. The evaluation results of the vinyl chloride resins are shown in Table 3.

In both cases of the formulation having a lower ratio of dispersion assistant and the formulation having a higher ratio of dispersion assistant, suspension polymerization was performed in a stable manner without scale adhesion, and good vinyl chloride-based resins having a very high porosity, a very high plasticizer absorbability, no coarse particles, and very few fish eyes were obtained. In each formulation, the vinyl chloride resin contained a PVA-based polymer (A).

Examples 2 to 8

Suspension polymerization of 2 different formulations of vinyl chloride was performed as in Example 1, using a PVA-based polymer (A) synthesized as in Example 1 except that a monoaldehyde having an olefinic unsaturated double bond shown in Table 1 was used, to give vinyl chloride resins. The evaluation results of the obtained vinyl chloride resins are shown in Table 2 and Table 3.

In each Example, in the case of the formulation having a lower ratio of dispersion assistant and even in the case of the formulation having a higher ratio of dispersion assistant, suspension polymerization was performed in a stable manner without scale adhesion, and good vinyl chloride-based resins having a very high porosity, a very high plasticizer absorbability, no coarse particles, and very few fish eyes were obtained. In each formulation, the vinyl chloride resin contained a PVA-based polymer (A).

Examples 9 to 13

In each Example, suspension polymerization of 2 different formulations of vinyl chloride was performed as in Example 1 except that the PVA-based polymer (A) and the PVA system polymer (B) used were different from those used in Example 1, to give vinyl chloride resins. The PVA-based polymer (B) used here was synthesized as in Example 1 except that the amount of methanol and the amount of 2,2'-azobis(4-methoxy-2,4-dimethylvaleronitril) used for the polymerization of vinyl acetate, the reaction yield, the kind and the amount of the catalyst for the saponification, saponification time, and the kind and the amount of the neutralizer were appropriately changed so that the resultant PVA system polymer (B) might have the polymerization degree, the saponification degree, and the block character shown in Table 1. The PVA-based polymer (A) used here was synthesized as in Example 1 except that the monoaldehyde having an olefinic unsaturated double bond shown in Table 1 was used. The evaluation results of the obtained vinyl chloride resins are shown in Table 2 and Table 3.

In Examples 9 to 11, as in Example 1, sodium hydroxide was used as the saponification catalyst, and acetic acid was used as the neutralizer in the saponification. In Examples 12 and 13, p-toluenesulfonic acid was used as the saponification catalyst, and sodium hydroxide was used as the neutralizer in the saponification.

In each Example, in the case of the formulation having a lower ratio of dispersion assistant and even in the case of the formulation having a higher ratio of dispersion assistant, suspension polymerization was performed in a stable manner without scale adhesion, and good vinyl chloride-based resins having a very high porosity, a very high plasticizer absorbability, no coarse particles, and very few fish eyes were obtained. In each formulation, the vinyl chloride resin contained a PVA-based polymer (A).

Comparative Example 1

Suspension polymerization of 2 different formulations of vinyl chloride was performed as in Example 1, using, as shown in Table 1, a dried product of the PVA-based polymer (B) as it was instead of the PVA-based polymer (A) as a dispersion assistant to give vinyl chloride resins.

The evaluation results of the obtained vinyl chloride resins are shown in Table 2 and Table 3.

In the case of the formulation having a lower ratio of dispersion assistant, the results were not far from those in Example 1. However, in the case of the formulation having a higher ratio of dispersion assistant, stable polymerization was not achieved. Scale adhesion was observed, and the resultant vinyl chloride resin had coarse particles, a slightly lower porosity, a slightly lower plasticizer absorbability, and many fish eyes.

Reference Example 1

Suspension polymerization of 2 different formulations of vinyl chloride was performed as in Example 1, using a PVA-based polymer (A) synthesized as in Example 1 except that the saponification time and the amount of the saponification catalyst added were changed so that the saponification degree shown in Table 1 might be achieved, to give vinyl chloride resins. The evaluation results of the obtained vinyl chloride resins are shown in Table 2 and Table 3.

Since the saponification degree of the PVA-based polymer (A) was as high as 68 mol %, the PVA-based polymer (A) as a dispersion assistant did not exert sufficient effects. In both cases of the formulation having a lower ratio of dispersion assistant and the formulation having a higher ratio of dispersion assistant, obtained particles were not uniform and coarse particles were observed. Considerable scale adhesion occurred, and stable polymerization was not achieved. The resultant vinyl chloride resins had insufficient porosity and plasticizer absorbability, and many fish eyes.

Reference Examples 2 and 3

PVA-based polymers (A) were synthesized as in Example 1 except that an aliphatic dialdehyde was used instead of the monoaldehyde having an olefinic unsaturated double bond as shown in Table 1.

In Reference Examples 2 and 3, due to the use of the aliphatic dialdehyde, the resultant PVA-based polymer (A) was insolubilized. Therefore, the analysis of the PVA-based polymer (A) was impossible. Also, since the PVA-based polymer (A) was insoluble in a water/methanol mixed solvent, it was impossible to conduct a vinyl chloride polymerization test. From the amount of unreacted aldehyde, the degree of acetalization was determined.

TABLE 1

| | PVA (B) | | | Aldehyde | | PVA (A) | | |
|---|---|---|---|---|---|---|---|---|
| | Polymerization degree | Saponification degree mol % | Block character | Type | Modification degree mol % | Polymerization degree | Saponification degree mol % | Block character |
| Example 1 | 230 | 53.0 | 0.45 | Acrolein | 0.9 | 230 | 55.3 | 0.47 |
| Example 2 | 230 | 53.0 | 0.45 | Acrolein | 0.2 | 230 | 54.5 | 0.46 |
| Example 3 | 230 | 53.0 | 0.45 | Acrolein | 7.0 | 230 | 56.5 | 0.49 |
| Example 4 | 230 | 53.0 | 0.45 | Methacrolein | 1.2 | 230 | 55.4 | 0.47 |
| Example 5 | 230 | 53.0 | 0.45 | Cinnamaldehyde | 0.5 | 230 | 55.5 | 0.47 |
| Example 6 | 230 | 53.0 | 0.45 | Citral | 0.7 | 230 | 55.4 | 0.47 |
| Example 7 | 230 | 53.0 | 0.45 | 2,4-Hexadienal | 0.8 | 230 | 55.3 | 0.47 |
| Example 8 | 230 | 53.0 | 0.45 | Trans-2-hexenal | 0.8 | 230 | 55.1 | 0.47 |
| Example 9 | 180 | 37.0 | 0.45 | Acrolein | 0.9 | 180 | 38.5 | 0.47 |
| Example 10 | 360 | 37.0 | 0.45 | Acrolein | 0.9 | 360 | 38.6 | 0.47 |
| Example 11 | 600 | 55.0 | 0.45 | Acrolein | 0.9 | 600 | 55.8 | 0.47 |
| Example 12 | 230 | 55.0 | 0.70 | Acrolein | 0.9 | 230 | 55.9 | 0.70 |
| Example 13 | 230 | 37.0 | 0.70 | Acrolein | 0.9 | 230 | 38.4 | 0.70 |
| Comparative Example 1 | 230 | 53.0 | 0.45 | — | — | — | — | — |
| Reference Example 1 | 230 | 68.0 | 0.45 | Acrolein | 1.0 | 230 | 68.0 | 0.46 |
| Reference Example 2 | 230 | 53.0 | 0.45 | Glyoxal | 1.0 | — | — | — |

TABLE 1-continued

| | PVA (B) | | | Aldehyde | | PVA (A) | | |
|---|---|---|---|---|---|---|---|---|
| | Polymerization degree | Saponification degree mol % | Block character | Type | Modification degree mol % | Polymerization degree | Saponification degree mol % | Block character |
| Reference Example 3 | 230 | 53.0 | 0.45 | Glutaraldehyde | 1.0 | — | — | — |

TABLE 2

Vinyl chloride polymer
(Formulation having lower ratio of dispersion assistant)

| | Average particle diameter μm | Amount of attached scale | On#60 % | Bulk specific gravity g/mL | Plasticizer absorbability % | Fish eye Count |
|---|---|---|---|---|---|---|
| Example 1 | 158 | Excellent | 0 | 0.53 | 24 | 33 |
| Example 2 | 166 | Excellent | 0 | 0.54 | 23 | 41 |
| Example 3 | 154 | Excellent | 0 | 0.53 | 24 | 30 |
| Example 4 | 152 | Excellent | 0 | 0.54 | 24 | 25 |
| Example 5 | 159 | Excellent | 0 | 0.53 | 25 | 35 |
| Example 6 | 164 | Excellent | 0 | 0.52 | 25 | 30 |
| Example 7 | 144 | Excellent | 0 | 0.53 | 24 | 35 |
| Example 8 | 159 | Excellent | 0 | 0.51 | 24 | 30 |
| Example 9 | 165 | Excellent | 0 | 0.52 | 25 | 20 |
| Example 10 | 164 | Excellent | 0 | 0.53 | 24 | 23 |
| Example 11 | 164 | Excellent | 0 | 0.52 | 24 | 30 |
| Example 12 | 165 | Excellent | 0 | 0.54 | 22 | 33 |
| Example 13 | 163 | Excellent | 0 | 0.53 | 23 | 20 |
| Comparative Example 1 | 159 | Excellent | 0 | 0.55 | 22 | 50 |
| Reference Example 1 | 172 | Good | 0.8 | 0.58 | 19 | 280 |
| Reference Example 2 | Unsuccessful polymerization (insolubilized) | | | | | |
| Reference Example 3 | Unsuccessful polymerization (insolubilized) | | | | | |

TABLE 3

Vinyl chloride polymer
(Formulation having higher ratio of dispersion assistant)

| | Average particle diameter μm | Amount of attached scale | On#60 % | Bulk specific gravity g/mL | Plasticizer absorbability % | Fish eye Count |
|---|---|---|---|---|---|---|
| Example 1 | 160 | Excellent | 0 | 0.50 | 34 | 3 |
| Example 2 | 172 | Excellent | 0 | 0.51 | 33 | 5 |
| Example 3 | 150 | Excellent | 0 | 0.52 | 31 | 2 |
| Example 4 | 154 | Excellent | 0 | 0.51 | 33 | 3 |
| Example 5 | 161 | Excellent | 0 | 0.50 | 35 | 4 |
| Example 6 | 167 | Excellent | 0 | 0.51 | 33 | 5 |
| Example 7 | 144 | Excellent | 0 | 0.49 | 35 | 1 |
| Example 8 | 163 | Excellent | 0 | 0.50 | 34 | 4 |
| Example 9 | 168 | Excellent | 0 | 0.49 | 38 | 3 |
| Example 10 | 166 | Excellent | 0 | 0.51 | 36 | 2 |
| Example 11 | 166 | Excellent | 0 | 0.51 | 35 | 2 |
| Example 12 | 168 | Excellent | 0 | 0.53 | 31 | 6 |
| Example 13 | 165 | Excellent | 0 | 0.49 | 35 | 6 |
| Comparative Example 1 | 197 | Good | 2.2 | 0.49 | 29 | 130 |
| Reference Example 1 | 198 | Poor | 1.5 | 0.55 | 22 | 300 |
| Reference Example 2 | Unsuccessful polymerization (insolubilized) | | | | | |
| Reference Example 3 | Unsuccessful polymerization (insolubilized) | | | | | |

INDUSTRIAL APPLICABILITY

The dispersion assistant of the present invention achieves stable production of a good polymer without much scale adhesion on the polymerization tank even when used in a large amount to obtain a high porosity, and enables production of a vinyl chloride-based resin having a very high porosity and an excellent plasticizer absorbability, not having coarse particles. Therefore, the dispersion assistant of the present invention is industrially very useful.

The invention claimed is:

1. A dispersion assistant for suspension polymerization, comprising a polyvinyl alcohol-based polymer having an acetal group, which has an olefinic unsaturated double bond, wherein the polyvinyl alcohol-based polymer has a saponification degree of less than 60 mol%.

2. The dispersion assistant for suspension polymerization of claim 1, wherein the degree of modification of the polyvinyl alcohol-based polymer by the acetal group-containing unit is 0.01 to 20 mol% relative to all the monomer units in the polyvinyl alcohol-based polymer.

3. The dispersion assistant for suspension polymerization of claim 1, wherein the average polymerization degree of the polyvinyl alcohol-based polymer is 120 to 800.

4. The dispersion assistant for suspension polymerization of claim 1, further comprising a water-soluble polymer in a polymerization system.

5. The dispersion assistant for suspension polymerization of claim 4, wherein the water-soluble polymer is a polyvinyl alcohol-based polymer having a saponification degree of 65 to 90 mol%.

6. A method of polymerizing a vinyl-based monomer comprising contacting the dispersion assistant for suspension polymerization of claim 1 with a vinyl-based monomer under conditions that promote polymerization.

7. The method of claim 6, wherein the vinyl-based monomer comprises vinyl chloride.

8. An aqueous liquid containing the dispersion assistant for suspension polymerization of claim 1.

9. A production method of a vinyl-based resin, comprising subjecting a vinyl-based monomer to suspension polymerization in the presence of the dispersion assistant for suspension polymerization of claim 1.

10. The production method of claim 9, wherein the suspension polymerization is performed further in the presence of a water-soluble polymer.

11. The production method of claim 10, wherein the water-soluble polymer is a polyvinyl alcohol-based polymer having a saponification degree of 65 to 90 mol%.

12. The production method of claim 9, wherein the vinyl-based monomer comprises vinyl chloride.

13. A vinyl-based resin, which comprises as a polymerization component, a polyvinyl alcohol-based polymer having an acetal group, which has an olefinic unsaturated double bond, wherein the polyvinyl alcohol-based polymer has a saponification degree of less than 60 mol% or less.

14. The vinyl-based resin of claim 13, wherein the degree of modification of the polyvinyl alcohol-based polymer by the acetal group-containing unit is 0.01 to 20 mol% relative to all the monomer units in the polyvinyl alcohol-based polymer.

15. The vinyl-based resin of claim 13, wherein the average polymerization degree of the polyvinyl alcohol-based polymer is 120 to 800.

16. The vinyl-based resin of claim 13, wherein said vinyl-based resin is a vinyl chloride-based resin.

17. The dispersion assistant for suspension polymerization of claim 1, wherein the polyvinyl alcohol-based polymer has a saponification degree of less than 56.5 mol%.

18. The dispersion assistant for suspension polymerization of claim 1, wherein the polyvinyl alcohol-based polymer does not have an acetal group which is made by an aliphatic monoaldehyde not having any olefinic unsaturated double bond.

* * * * *

UNITED STATES PATENT AND TRADEMARK OFFICE
CERTIFICATE OF CORRECTION

PATENT NO. : 10,731,032 B2
APPLICATION NO. : 15/778189
DATED : August 4, 2020
INVENTOR(S) : Kozuka et al.

It is certified that error appears in the above-identified patent and that said Letters Patent is hereby corrected as shown below:

In the Specification

In Column 4, Line 51, delete "3-buthenal," and insert -- 3-butenal, --.

In Column 7, Line 63 (approx.), delete "(OH,OR)" and insert -- (OH, OR) --.

In Column 17, Lines 2-3, delete "dimethylvaleronitril)" and insert -- dimethylvaleronitrile) --.

In Column 19, Line 4, delete "dimethylvaleronitril)" and insert -- dimethylvaleronitrile) --.

In the Claims

In Column 23, Line 19, Claim 13, delete "mol% or less." and insert -- mol%. --.

In Column 24, Line 13, Claim 17, delete "less than 56.5 mol%." and insert -- 56.5 mol% or less. --.

Signed and Sealed this
Twenty-seventh Day of October, 2020

Andrei Iancu
*Director of the United States Patent and Trademark Office*